US010738433B2

(12) United States Patent
Chang et al.

(10) Patent No.: US 10,738,433 B2
(45) Date of Patent: Aug. 11, 2020

(54) OFFSHORE WIND TURBINE SUPPORT STRUCTURE MONITORING SYSTEM AND OPERATING METHOD THEREOF

(71) Applicant: SHIP AND OCEAN INDUSTRIES R&D CENTER, New Taipei (TW)

(72) Inventors: Yuan-Yi Chang, New Taipei (TW); Cheng-Hsien Chung, New Taipei (TW); Shean-Kwang Chou, New Taipei (TW); Jia-Rong Lyu, New Taipei (TW); Shao-Hua Yang, New Taipei (TW); Yan-Wei Wu, New Taipei (TW)

(73) Assignee: SHIP AND OCEAN INDUSTRIES R&D CENTER, New Taipei (TW)

( * ) Notice: Subject to any disclaimer, the term of this patent is extended or adjusted under 35 U.S.C. 154(b) by 0 days.

(21) Appl. No.: 16/231,437

(22) Filed: Dec. 22, 2018

(65) Prior Publication Data
US 2019/0218738 A1 Jul. 18, 2019

(30) Foreign Application Priority Data
Dec. 22, 2017 (TW) .............................. 106145379 A

(51) Int. Cl.
| | | |
|---|---|---|
| *E02B 17/02* | (2006.01) | |
| *E02B 17/00* | (2006.01) | |
| *F03D 13/25* | (2016.01) | |
| *F03D 17/00* | (2016.01) | |
| *E02D 27/42* | (2006.01) | |
| *E02D 27/16* | (2006.01) | |
| *G01K 1/14* | (2006.01) | |
| *G01C 9/00* | (2006.01) | |
| *G01N 27/02* | (2006.01) | |
| *G01M 5/00* | (2006.01) | |

(52) U.S. Cl.
CPC .......... *E02B 17/0034* (2013.01); *E02D 27/16* (2013.01); *E02D 27/425* (2013.01); *F03D 13/25* (2016.05); *F03D 17/00* (2016.05); *G01C 9/00* (2013.01); *G01K 1/14* (2013.01); *G01M 5/0041* (2013.01); *G01N 27/02* (2013.01); *E02B 2017/0091* (2013.01); *E02D 2600/10* (2013.01); *F05B 2270/303* (2013.01); *F05B 2270/807* (2013.01); *F05B 2270/808* (2013.01); *Y02E 10/727* (2013.01)

(58) Field of Classification Search
CPC ....................... E02B 2017/0091; Y02E 10/727
See application file for complete search history.

(56) References Cited

U.S. PATENT DOCUMENTS

| | | | |
|---|---|---|---|
| 2005/0100414 A1* | 5/2005 | Salama ................... | E21B 17/01 405/224.2 |
| 2007/0243063 A1* | 10/2007 | Schellstede ............. | E02D 27/42 416/10 |

(Continued)

*Primary Examiner* — Frederick L Lagman
(74) *Attorney, Agent, or Firm* — Cheng-Ju Chiang

(57) ABSTRACT

An offshore wind turbine support structure monitoring system and operating method are disclosed, comprising an offshore wind turbine, at least one state detection module, a data acquisition module, a data storage module, a network transmission module and at least one client. Thus, the maintenance of offshore wind turbines can be monitored directly and instantly to estimate the maintenance period, adjust the optimal operation and maintenance strategy, and save the cost.

10 Claims, 4 Drawing Sheets

(56) References Cited

U.S. PATENT DOCUMENTS

| | | | |
|---|---|---|---|
| 2009/0090191 A1* | 4/2009 | Lenders | E02B 17/0818 73/786 |
| 2009/0127861 A1* | 5/2009 | Sankrithi | F03B 13/264 290/54 |
| 2010/0219645 A1* | 9/2010 | Yamamoto | F03D 1/04 290/55 |
| 2011/0140420 A1* | 6/2011 | Loh | F03D 7/0224 290/44 |
| 2011/0148115 A1* | 6/2011 | Roznitsky | F03D 13/25 290/44 |
| 2011/0204636 A1* | 8/2011 | Scholte-Wassink | F03D 7/0296 290/44 |
| 2012/0049532 A1* | 3/2012 | Scholte-Wassink | F03D 13/25 290/55 |
| 2012/0282036 A1* | 11/2012 | Taenaka | E02B 17/027 405/224.2 |
| 2013/0302096 A1* | 11/2013 | Rodr Guez Tsouroukdissian et al. | E02B 17/0008 405/225 |
| 2013/0302139 A1* | 11/2013 | Wittrisch | F03D 7/0204 415/14 |
| 2014/0115987 A1* | 5/2014 | Rodriguez Tsouroukdissian | E02D 27/42 52/298 |
| 2015/0211488 A1* | 7/2015 | Bowyer | F03D 7/02 416/1 |
| 2016/0230746 A1* | 8/2016 | Dagher | B63B 39/03 |
| 2017/0009480 A1* | 1/2017 | Bucknell | E02D 27/525 |
| 2017/0159260 A1* | 6/2017 | Stiesdal | E04H 12/00 |

* cited by examiner

OFFSHORE WIND TURBINE SUPPORT STRUCTURE MONITORING SYSTEM AND OPERATING METHOD THEREOF

TECHNICAL FIELD

This invention discloses an offshore wind turbine support structure monitoring system and operating method thereof, specifically indicating an offshore wind turbine support structure monitoring system comprising different kinds of sensors which are configured on distinguishable and certain location of the offshore wind turbine, therefore to integrate the data collecting and the beneficial strategy of offshore wind turbine support structure monitoring.

DESCRIPTION OF THE RELATED ART

The generation equipment of the offshore wind power is used to be the offshore wind turbine. The present offshore wind turbine usually comprises the operating structure on the water and the underwater support structure such as the pile or the pedestals. On the other hand, the mentioned offshore wind turbine is installed in shallow water, even the deep water of 200 meters.

No matter where the offshore wind turbine is installed, offshore wind turbines sit for a long time in unmanned waters, and influenced by waves, currents, earthquakes, winds, loose seabed, explosions and collisions. Offshore wind turbines are not only hard to maintain, the cost of inspection and maintenance is much. Particularly, the unpredictable maintenance operations also increase the operating costs in order the downtime. Therefore, maintenance operations must be carried out efficiently.

As the operating period of offshore wind turbines increases simultaneously, the structural integrity also decreases. The impact factors include disturbance from external turbulent flow and internal fan operation. These factors cause the support structure to vibrate, stress concentration and tilt phenomenon, all abovementioned which are indicators of the "health status" for each offshore wind turbine structure.

In addition, for offshore wind turbine support structures, foundations or pedestals and other parts, it is also associated with corrosion, such as stress corrosion, structural damage caused by changes in environmental conditions. It can be more traced to the sea with the corrosion of the splash zone. Therefore, for the maintenance of offshore wind turbines, it lacks integrated solutions that optimize the location and management of hardware configurations for a long-term operation of structural safety.

SUMMARY

To provide the solutions of the problems mentioned in the paragraph Description of the Related Art, the present invention discloses an offshore wind turbine support structure monitoring system and operating method thereof.

The offshore wind turbine support structure monitoring system comprising an offshore wind turbine, at least one sensor module, a data extraction module, a data storage module, a network transmission module and at least one terminal.

The at least one sensor module is configured in the offshore wind turbine. The data extraction module connects to the at least one sensor module. The data extraction module is connected with the at least one sensor module. The data storage module connects to the data extraction module. The network transmission module is connected with the data extraction module, and the at least one terminal is connected with said network transmission module.

In addition, the present invention further discloses an operating method of the offshore wind turbine support structure monitoring system, mainly comprising five steps (a) to (e). The step (a) is providing the aforementioned offshore wind turbine support structure monitoring system. Step (b) is detecting at least one kind of real-time data of an offshore wind turbine via at least one sensor module. Step (c) is integrating the at least one kind of real-time data by a data extraction module, and forming at least one kind of historical data by saving the at least one kind of real-time data in a data storage module.

The step (d) is transmitting the at least one kind of real-time data or the at least one kind of historical data saved in the data storage module to a network transmission module by the data extraction module. At last, the step (e) reporting the at least one kind of real-time data or the at least one kind of historical data to the at least one terminal by the network transmission module.

DESCRIPTION OF THE PREFERRED EMBODIMENTS

To clarify the purpose, technical solutions, and the advantages of the disclosure, embodiments of the invention will now be described more fully hereinafter with reference to the accompanying drawings.

Figure 1:
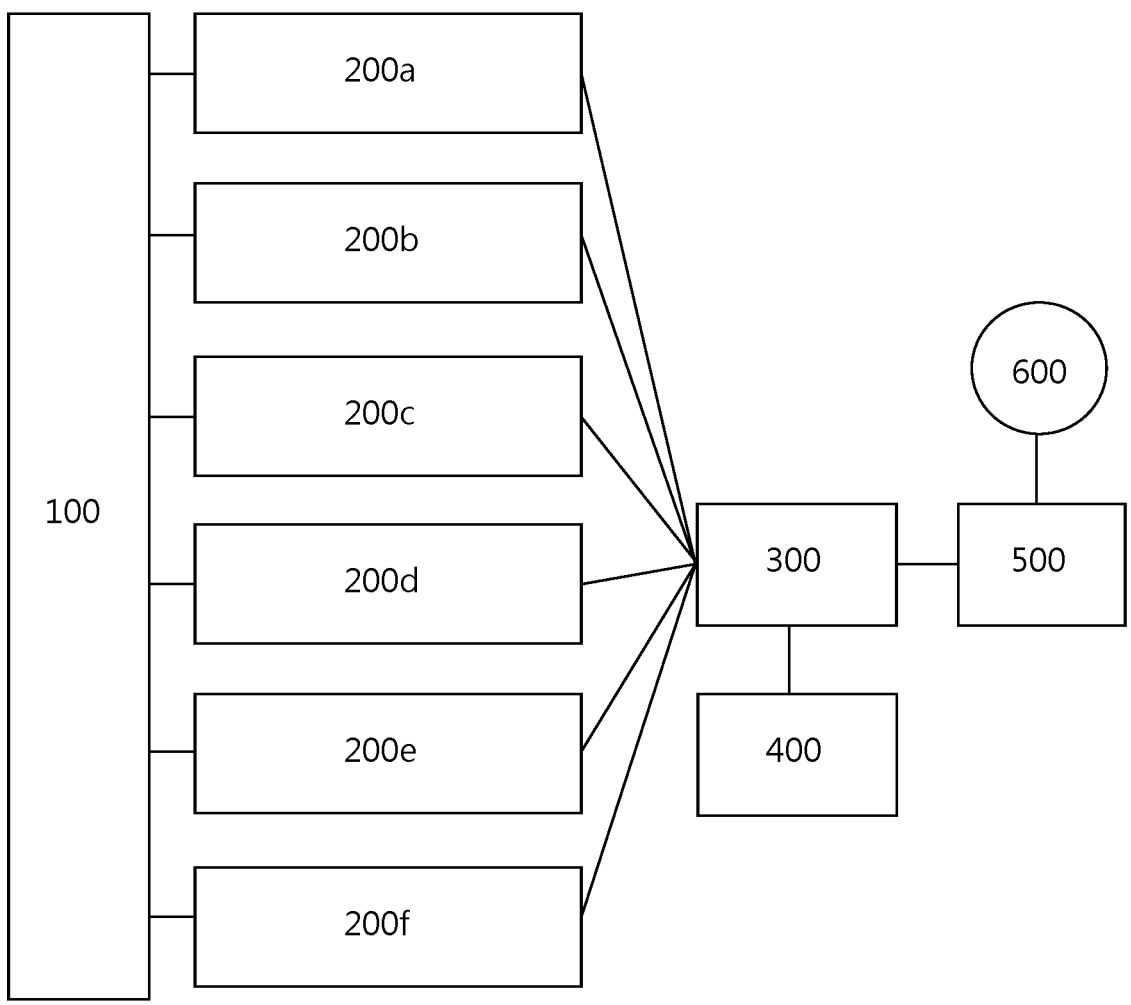
FIG. 1 is a system diagram in accordance with one embodiment of the present disclosure.

Please refer to FIG. 1. FIG. 1 is a system diagram in accordance with one embodiment of the present disclosure. As the system illustrated in FIG. 1, the offshore wind turbine support structure monitoring system of the present embodiment 10 comprising an offshore wind turbine 100, at least one sensor module (200*a*, 200*b*, 200*c*, 200*d*, 200*e*, 200*f*), a data extraction module 300, a data storage module 400, a network transmission module 500 and at least one terminal 600.

The at least one sensor module (200*a*, 200*b*, 200*c*, 200*d*, 200*e*, 200*f*) are configured on offshore wind turbine 100. Data extraction module 300 is connected with the at least one sensor module (200*a*, 200*b*, 200*c*, 200*d*, 200*e*, 200*f*) and the data storage module 400. The network transmission module 500 is connected with the data extraction module 300, and the at least one terminal 600 is connected with the network transmission module 500.

In the present embodiment, the at least one sensor module (200*a*, 200*b*, 200*c*, 200*d*, 200*e*, 200*f*) are regard as several kinds of sensor modules (200*a*, 200*b*, 200*c*, 200*d*, 200*e*, 200*f*) such as the at least two acceleration sensors, at least two strain force sensors, at least two electrical resistance sensors, at least two coating impedance sensors, at least two temperature sensors, at least one inclinometer respectively. In other embodiment, the combination of different kinds of sensor modules is also capable. All of the aforementioned at least one sensor module (200a, 200b, 200c, 200d, 200e, 200f) is configured on the same offshore wind turbine 100 simultaneously.

In the present embodiment, data extraction module 300 is able to be industrial computers, super computers or computing devices with data conversion functions. The data storage module 400 is regard as a hard disk or a storage device that has the function of storing data such as a hard disk drive, which is not limited in the present invention.

However, in the implementable embodiments, the signal detected by the at least one sensor module (200a, 200b, 200c, 200d, 200e, 200f) is able to be integrated by a SCADA (Supervisory Control And Data Acquisition) built in the data extraction module 300. The data extracted from the data storage module 400 is also processed by the aforementioned SCADA, and transmitted to the at least one terminal 600 via network transmission module 500.

Moreover, each of the at least one sensor module (200a, 200b, 200c, 200d, 200e, 200f) further comprises a signal extractor. Every single signal extractor is connected with every acceleration sensors, strain force sensors, electrical resistance sensors, coating impedance sensors, temperature sensors or inclinometers. On the other hand, each of the signal extractors connects to the data extraction module 300. The signal extractors of the present embodiment indicates to be analog-to-digital converters, converting the signal detected by the at least one sensor module (200a, 200b, 200c, 200d, 200e, 200f) from analog data to digital data thus to transmit it to the data extraction module 300.

For instance, the present embodiment shows that the sensor module 200a is a combination of signal extractor and the at least two acceleration sensors. Specifically, said at least two acceleration sensors are integrated electronic piezoelectric accelerometers, piezo-resistance accelerometers, capacitive micro-electromechanical systems accelerometers, Servo force balance accelerometers or the combination thereof. Thus to detect the structural vibration data, damping data or the model per se of the offshore wind turbine 100. The present invention is not limited to this embodiment.

The sensor module 200b is a combination of signal extractor and the at least two strain force sensors. The at least two strain force sensors of the present embodiment is implementable as electrical resistance strain gauges, load cells, vibrating wire strain gauges, Fiber optic strain gauges or the combination thereof. It is used to detect the strain force data of the portion which the strain force sensor configured. The present invention is not limited to this embodiment.

Sensor module 200c is a combination of signal extractor and the at least two electrical resistance sensors. The electrical resistance sensor of the present embodiment is electrical resistance probe, detecting the corrosion of the offshore wind turbine 100, thus to calculate the velocity of corrosion. Sensor module 200d is a combination of signal extractor and coating impedance sensors. The coating impedance sensor used in the present embodiment is the coating impedance analysis device, detecting the Anti-corrosion ability of structural coating layer of offshore wind turbine 100.

The sensor module 200e is a combination of signal extractor and temperature sensors, detecting the condition reaches the corrosion environment or not. The sensor module 200f is a combination of signal extractor and inclinometer. On the other hand, the inclinometer of the present invention also can be chip tilt sensor or gyroscope. The present invention is not limited to this embodiment.

Figure 2:
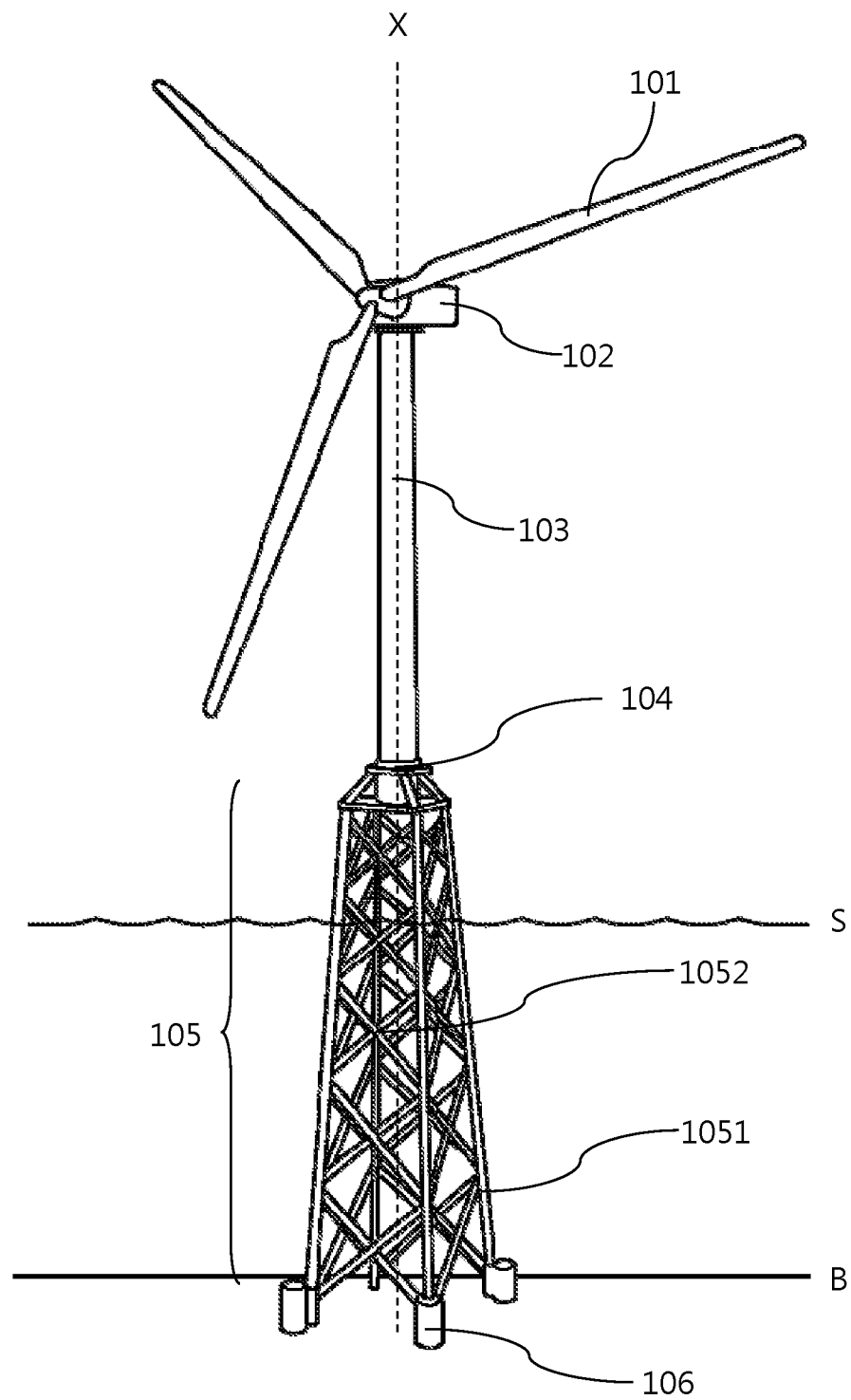
FIG. 2 is a structural diagram of an offshore wind turbine in accordance with one embodiment of the present disclosure.
Figure 3:
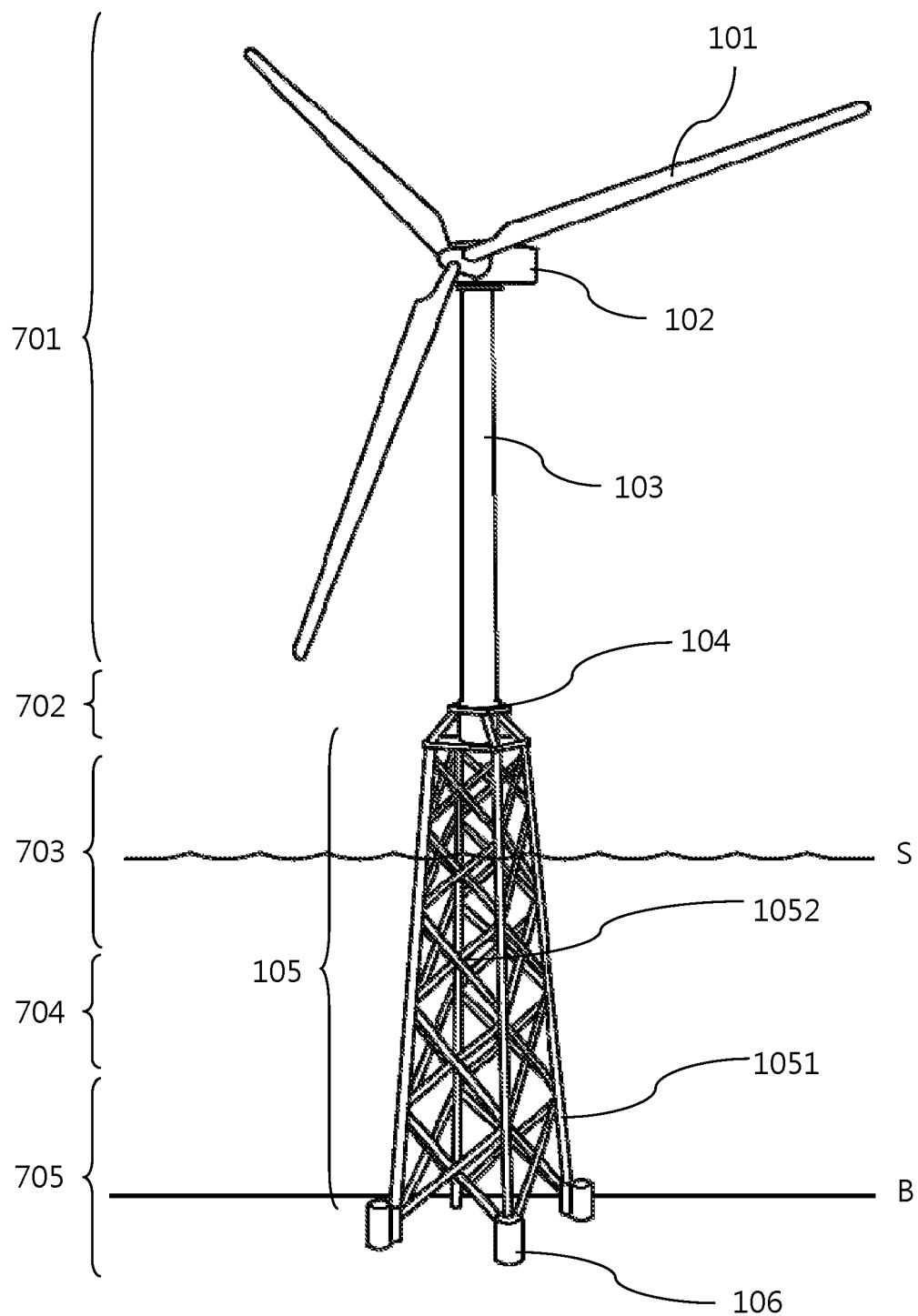
FIG. 3 is an integral diagram of an offshore wind turbine and an offshore construction in accordance with one embodiment of the present disclosure.

Please refer to FIG. 2 and FIG. 3 simultaneously. FIG. 2 is a structural diagram of an offshore wind turbine in accordance with one embodiment of the present disclosure. FIG. 3 is an integral diagram of an offshore wind turbine and an offshore construction in accordance with one embodiment of the present disclosure.

As the FIG. 2 illustrates, the offshore wind turbine 100 described in this embodiment of the present invention comprises the structure both above and under water. In particular, the definition of the offshore wind turbine 100 should be regarded as a whole structure comprising pile foundation module 106, jacket 105, platform 104, tower 103 and nacelle 102.

In the present embodiment, nacelle 102 connects to tower 103, and plurality of blades is connects to nacelle 102. The tower 103 connects to platform 104 and platform 104 connects to jacket 105. The aforementioned platform 104 is set above level S. The jacket 105 is connected with pile foundation module 106. The jacket 105 and pile foundation module 106 are set in the sea and sea floor respectively. Furthermore, the jacket 105 of the present embodiment comprises at least three legs 1051 and plurality of braces 1052. Specifically, the number of at least three legs 1051 is four in this embodiment, and braces 1052 are crossly set and connected between each of legs 1051.

In other implementable embodiment, a data collection station is built in the platform 104 of the offshore wind turbine 100. As described in the present embodiment, the aforementioned data extraction module 300, data storage module 400 or the network transmission module 500 are selectively incorporated in the data collection station. The present invention is not limited to this embodiment.

In this embodiment, sensor module 200a is distinguishable from five different configuration portions of acceleration sensors on offshore wind turbine 100, in order to achieve the best acceleration detection. The abovementioned acceleration sensors comprises at least one first acceleration sensor, at least one second acceleration sensor, at least one third acceleration sensor, at least one fourth acceleration sensor and at least one fifth acceleration sensor.

The at least one first acceleration sensor is configured on the inner wall of tower 103 which reaches the nacelle 102. Specifically, the at least one first acceleration sensor is configured on 0 to 5 meters from the engagement of nacelle 102 and tower 103. The at least one second sensor is configured on the inner wall of tower 103 which is between the nacelle 102 and platform 104 randomly. More specifically, it is configured on anywhere in the middle of tower 103.

The at least one third acceleration sensor is configured in the inner wall of the tower 103 which starts from −5 to 5 meters of the engagement of platform 104 and tower 103. The at least one fourth sensor is configured on the jacket 105. In this embodiment, the at least one fourth acceleration sensor is located on the jacket 105 and within 5 meters of the platform 104, it allows to measure the relative acceleration of offshore wind turbine 100 structure which is below platform 104 and sea floor B.

In this embodiment, at least one first acceleration sensor, at least one second acceleration sensor and at least one third acceleration sensor are configured on axis X, and at least one fifth Acceleration sensor is further configured on the offshore wind turbine 100 outside axis X. In this way, the at least one first acceleration sensor, at least one second acceleration sensor and the at least one third acceleration sensor form a three-dimensional space with at least one fifth acceleration sensor, so as to measure the magnitude of the torsional motion of the offshore wind turbine 100 structure.

The sensor module 200b of the present embodiment uses three types of strain force sensors to instantly sense the change in stress caused by the wind on the overall offshore wind turbine 100. The sensor module 200b comprises at least two first strain force sensors, at least one second strain force sensor, and At least one third strain force sensor.

The first strain force sensor is located at the bottom of one of the legs 1051. More precisely, the first strain force sensor is located within 10 meters of leg 1051 from sea floor B. The first strain force sensor should be placed on the windward side of the prevailing winds, this leg 1051 subject to suffer the largest pulling force. The rest of the first strain force sensors are optionally positioned on the leeward side of the prevailing wind, which may cause the most stressed leg 1051. This area is the area where the structure is most compressive.

The second strain force sensor can be configured on the plurality of brace 1052 and leg 1051 synchronically. More specifically, brace 1052 and leg 1051 are located within −5 to 5 meters of the level S. This position belongs to the structure of long wave response to the wave direction in order to measure the wave effect. While the third strain force sensor is able to be configured on the inner wall of the tower 103 within 5 meters of the engagement of tower 103 and platform 104.

The acceleration sensor or strain force sensor described in the abovementioned sensor module 200a and sensor module 200b needs to evaluate the monitoring position through structural simulation analysis. All acceleration sensors or strain force sensors are required to refer to the sea meteorological observation statistics, fan structure design, according to adjust the exact installation location per se. The present invention is not limited to this embodiment.

In view of the sensor module 200c, sensor module 200d, sensor module 200e installation location, level S and hydrological changes are closely related. Therefore, please refer to FIG. 3. FIG. 3 clearly defines a level S as the origin (it means the 0 point) and the other zones. The zones of present embodiment illustrated in FIG. 3 are based on the International Standard Wind turbines—Part 3: Design requirements for offshore wind turbines, hydrological interval as defined in IEC 61400-3.

Zone 701 is the atmospheric zone and zone 701 is typically the main area that provides the power generation source of offshore wind turbine 100. The zone 702 is splash zone where zone 702 is often accompanied by areas of severe corrosion that must be monitored for corrosion. Zone 703 is the tidal zone, which is usually the location of the seawater tide changing. The tidal zone's highest and lowest water level is usually defined the highest astronomical tide and the lowest astronomical tide. Zone 704 is the submerged zone, which means that there is a huge impact on the current. Zone 705 is the mud zone, which is the closest zone of sea floor B.

The highest astronomical tide indicates purely with astronomical limit-rising tide levels, excluding climatic conditions. On the other hand, the lowest astronomical tide refers to the lowest astronomical extreme ebb water level as the lowest astronomical tide The sensor module 200c comprising at least two electrical resistance sensors of the present embodiment is configured in the submerged zone of the offshore wind turbine 100, which means that it is in the zone 704 but near the zone 703. More precisely, it lies between 0 and 10 meters below the level S of the lowest astronomical tide. To detect the corrosion of the structure, the rest of the need to increase the measurement points. The present invention is not limited to this embodiment.

The sensor module 200d comprising at least two coating impedance sensors is configured in the splash zone of offshore wind turbine 100 that means the zone 702. It is between 0 and 5 meters above the highest astronomical tide of level S. This zone is one of the areas with severe corrosion. The rest of the measuring points shall be considered as the structural requirements of the offshore wind turbine 100. The present invention is not limited to this embodiment.

In this embodiment, sensor module 200e comprises two kinds of temperature sensors. It is considered as the at least one first sensor and the at least one second sensor. The at least one first temperature sensor is configured on the structure of the offshore wind turbine 100 below the level S. The at least one second temperature sensor is configured on the structure of the offshore wind turbine 100 above the level S. More precisely, the at least one first temperature sensor must be located in zone 704. The at least one second temperature sensor must be located in the atmosphere zone. Finally, the Sensor module 200f detects the tilt of the overall offshore wind turbine 100 by providing at least one inclinometer which is configured on the platform 104 or inside the tower 103.

Figure 4:
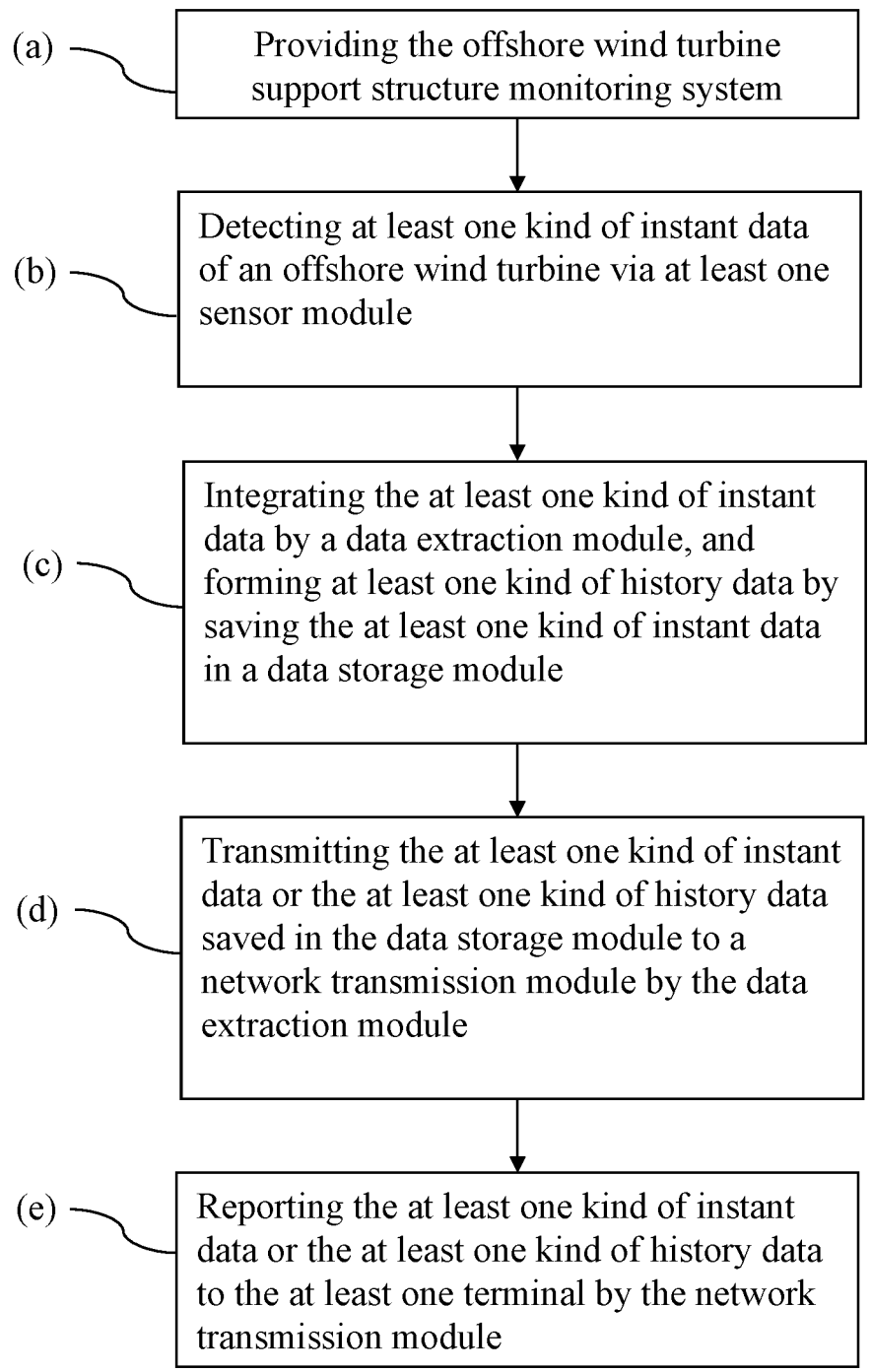
FIG. 4 is a flow chart of an operating method in accordance with one embodiment of the present disclosure.

Please refer to FIG. 4. FIG. 4 is a flow chart of an operating method in accordance with one embodiment of the present disclosure. In the present embodiment, it mainly executes five steps respectively. Step (a) is providing the aforementioned offshore wind turbine support structure monitoring system. Step (b) is detecting at least one kind of real-time data of an offshore wind turbine via at least one sensor module. Step (c) is integrating the at least one kind of real-time data by a data extraction module, and forming at least one kind of historical data by saving the at least one kind of real-time data in a data storage module.

The step (d) is transmitting the at least one kind of real-time data or the at least one kind of historical data saved in the data storage module to a network transmission module by the data extraction module. At last, the step (e) reporting the at least one kind of real-time data or the at least one kind of historical data to the at least one terminal by the network transmission module.

In step (a), the mentioned offshore wind turbine indicates to the offshore wind turbine 10 illustrated in FIG. 1 to FIG. 3. In step (b), the at least one sensor module (200a, 200b, 200c, 200d, 200e, 200f) detects several kinds of signals. Therefore to convert the analog signal to digital signal, as the real-time data.

The real-time data mentioned in this embodiment comprising at least one kind of acceleration data, at least one kind of strain force data, at least one kind of electrical resistance data, at least one kind of coating impedance data, at least one kind of temperature data, at least one kind of tilt data or the combination thereof. In the implementable embodiment, the real-time data is able to be quantified.

For instance, in some embodiment, setting the total score to 100. A warning is issued when at least one acceleration data, at least one strain force data, at least one structural resistance data, at least one coating impedance data, at least one temperature data or at least one inclination data reaches 60 points in total. In other embodiment, the at least one acceleration data, at least one strain force data, at least one structural resistance data, at least one coating impedance data, at least one temperature data or at least one inclination data may also be used to separately calculate and rank the signals and score. The colour of score is correspondingly displayed on a screen.

In other words, the screen of the mentioned embodiment shows the sketch of offshore wind turbine 100. The aforementioned colour changes and reflects the structural score of the offshore wind turbine 100. For example, setting a central point is defined by the location of an acceleration sensor. Tower 103 regards as an upper portion and a lower portion via said central point, the colour displays the needs of emergency situation or the requirement of maintenance. If the score is over 50 points, it shows the yellow colour. Over 75 points that represents the warning situation, it shows the orange colour. Over 90 points that means the red emergency situation, an instant maintenance is required.

In step (c), the data Extraction module 300 stores at least one kind of real-time data of step (b) into the data storage module 400, forming at least one historical data. To be more precise, the at least one kind of historical data is a result of integrated at least one kind of real-time data. Each at least one kind of real-time data is a state generated by an instantaneous point of the entire offshore wind turbine support structure monitoring system 10. Through the establishment of a time axis, each of the at least one kind of real-time data combines to the time axis that form the at least one kind of historical data.

When the data is requested via the external unit such as the operating and maintenance centre, step (s) is executed. The data extraction module 300 transmits the at least one kind of real-time data, or transmits the at least one kind of the historical data stored in data storage module 400 at a certain time or interval to network transmission module 500. In step (e), network transmission module 500 reports the at least one kind of real-time data or at least one kind of the historical data to at least one terminal 600.

In this embodiment, the network transmission module 500 may be a device capable of transceiving or transmitting wirelessly, such as a router or a server, and the at least one terminal 600 may be a communication device, a mobile device, a notebook, a personal computer, or a terminal transceiver equipment.

What is claimed is:

1. An offshore wind turbine support structure monitoring system, comprising:
    an offshore wind turbine, comprising:
    a pile foundation module configured on sea floor;
        a jacket connected with the pile foundation module, wherein the jacket is set in the sea;
        a platform connected with the jacket, wherein the platform is above the sea;
        a tower connected with the platform; and
        a nacelle connected with the tower as well as a plurality of blades;
    at least one sensor module configured on the offshore wind turbine;
    a data extraction module connected with the at least one sensor module;
    a data storage module connected with the data extraction module;
    a network transmission module connected with the data extraction module; and
    at least one terminal connected with the network transmission module;
    wherein the at least one sensor module is at least two acceleration sensors, at least two strain sensors, at least two electrical resistance sensors, at least two coating impedance sensors, at least two temperature sensors, at least one inclinometer or a combination thereof;
    wherein the at least two electrical resistance sensors are configured to lie between 0 to −10 meters below the level S of the lowest astronomical tide of the offshore wind turbine.

2. The offshore wind turbine support structure monitoring system as claimed in claim 1, wherein each of the at least one sensor module further comprises a signal extractor connected with each of the at least two acceleration sensors, each of the at least two strain sensors, each of the at least two electrical resistance sensors, each of at least two coating impedance sensors, each of the at least two temperature sensors or each of the at least one inclinometer; wherein each of the signal extractors is connected with the data extraction module.

3. The offshore wind turbine support structure monitoring system as claimed in claim 2, wherein the at least two acceleration sensor comprising:
    at least one first acceleration sensor configured on an inner wall of the tower which reaches the nacelle;
    at least one second acceleration sensor configured on the inner wall of the tower which is between the nacelle and the platform;
    at least one third acceleration sensor configured on the inner wall of an engagement of the platform and the tower; and
    at least one fourth acceleration sensor configured on the jacket;
    wherein the at least one first acceleration sensor, the at least one second acceleration sensor and the at least one third acceleration sensor are configured on a vertical axis of the offshore wind turbine, and at least one fifth sensor is configured away from the vertical axis.

4. The offshore wind turbine support structure monitoring system as claimed in claim 2, wherein the jacket further comprises:
    at least three legs connected with the pile foundation module; and
    a plurality of braces configured between the at least three legs.

5. The offshore wind turbine support structure monitoring system as claimed in claim 4, the at least two strain sensor comprising:
    at least two first strain sensors configured on bottom of the at least three legs;
    at least one second strain sensor configured on the plurality of braces and upper portion of the at least three legs; and
    at least one third strain sensor configured in the inner wall of the tower which reaches the engagement of the tower and the platform.

6. The offshore wind turbine support structure monitoring system as claimed in claim 2, the at least two temperature sensors comprising:
    at least one first temperature sensor configured on the offshore wind turbine under water; and
    at least two second temperature sensors configured on the offshore wind turbine above water.

7. The offshore wind turbine support structure monitoring system as claimed in claim 2, wherein the at least one inclinometer is configured on the platform or inside the tower.

8. The offshore wind turbine support structure monitoring system as claimed in claim 1, wherein the at least two coating impedance sensors are configured above 0 to 5 meters of highest astronomical tide of the offshore wind turbine.

9. An operating method of an offshore wind turbine support structure monitoring system, comprising:
  step (a) for providing the offshore wind turbine support structure monitoring system as claimed in claim 1;
  step (b) for detecting at least one kind of instant data of an offshore wind turbine via at least one sensor module;
  step (c) for integrating the at least one kind of instant data by a data extraction module, and forming at least one kind of history data by saving the at least one kind of instant data in a data storage module;
  step (d) for transmitting the at least one kind of instant data or the at least one kind of history data saved in the data storage module to a network transmission module by the data extraction module; and
  step (e) for reporting the at least one kind of instant data or the at least one kind of history data to the at least one terminal by the network transmission module.

10. The operating method of an offshore wind turbine support structure monitoring system as claimed in claim 9, wherein the at least one kind of instant data comprises at least one kind of acceleration data, at least one kind of strain data, at least one kind of electrical resistance data, at least one kind of coating impedance data, at least one kind of temperature data, at least one kind of tilt data or a combination thereof.

* * * * *